Dec. 6, 1927.
L. H. HERSHFIELD
TRACTION VEHICLE BRAKE
Filed Nov. 6, 1924
1,651,524
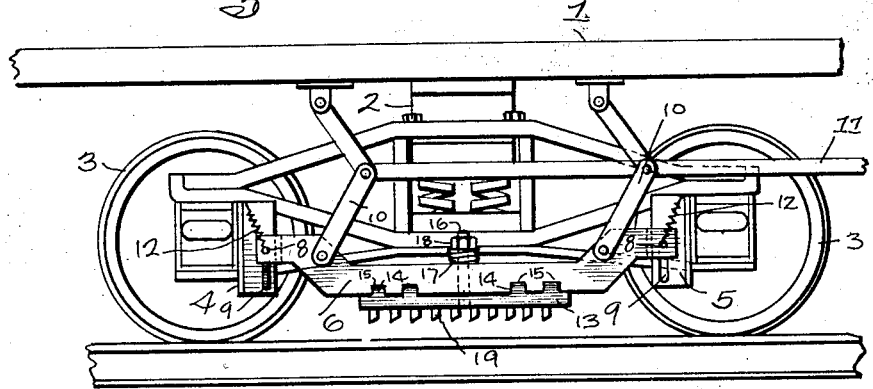
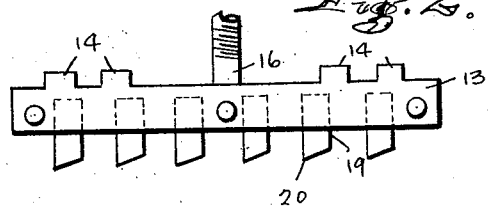
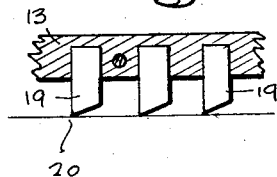
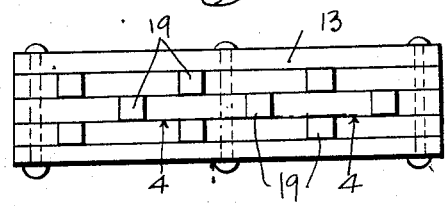
INVENTOR
LEWIS H. HERSHFIELD
BY ATTY Patented Dec. 6, 1927.

1,651,524

UNITED STATES PATENT OFFICE.

LEWIS H. HERSHFIELD, OF SAN FRANCISCO, CALIFORNIA.

TRACTION-VEHICLE BRAKE.

Application filed November 6, 1924. Serial No. 748,047.

This invention relates particularly to a braking mechanism to be mounted on traction cars and vehicles and other types of conveyances.

An object of the invention is to provide a braking mechanism for conveyances to be used only in cases of extreme necessity, when other brakes on the conveyances have failed to retard movement thereof.

A further object of the invention is to provide a braking mechanism to be mounted on a vehicle, which consists of a plurality of cutting tools arranged on a common plane, adapted to be moved into cutting contact with the surface over which the vehicle moves.

A still further object of the invention is to provide a braking mechanism on a vehicle, consisting of a plurality of sharpened cutters movable into and from contact with the tracks on which the vehicle runs, the brake operating mechanism being of a character to hold the brake cutters in contact with the vehicle tracks.

Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawings.

Fig. 1 is a side elevation of a fragmentary portion of a passenger vehicle having a braking mechanism mounted thereon, constructed in accordance with my invention.

Fig. 2 is an enlarged side elevation of the brake shoe.

Fig. 3 is a plan view of Fig. 2.

Fig. 4 is a sectional view taken through Fig. 3, on the line 4—4.

The greater majority of passenger conveyances such as street cars, trains and the like are equipped with braking mechanisms operated either manually or through some efficient mechanical apparatus. Such types of braking mechanisms operate upon the traction wheels of the conveyances to slow down the rolling speed thereof. Where braking mechanisms of this character become inoperative, as frequently occurs, it becomes practically impossible to bring the vehicle to a stop and as a result serious injury may be caused the vehicle and passengers. My invention contemplates the construction and placement of an "emergency" braking mechanism on a vehicle, which in the true sense of the word is an "emergency" brake to be used only in the event that the primary braking mechanism should cease to function. My form of braking apparatus operates relative to and upon the tracks or surface over which the vehicle moves and not in relation to any moving part of the vehicle.

In detail, the construction illustrated in the drawings comprises, the body of a vehicle 1 supported in a conventional manner on the traction wheel truck mechanism 2. The traction wheels 3 may or may not be operatively connected to a power generating mechanism, as my invention will operate as effectively upon a truck equipped with a power generating device as on one not so equipped. The truck 2 is provided with a pair of spaced frame members 4 and 5, in which the traction wheels 3 are rotatably journaled. Between the frame members 4 and 5, I have arranged a holder 6 having its opposite ends slotted to slidably engage the edges of the frame members 4 and 5. Pins 8 are mounted in the ends of the holder 6 and extend through slots 9 provided in the frames 4 and 5, whereby the movement of the holders 6, within a predetermined distance in a vertical direction, is regulated and controlled. The upper portion of the holder 6 has a lever mechanism 10 operatively mounted thereon, and connected by a control bar 11 to a place accessible to manipulation by the vehicle operator, whereby the holder 6 may be raised or lowered relative to the frame members 4 and 5. In order to hold the holder 6 in an elevated position, I have attached the ends of coil springs 12 to the opposite ends of the holder 6 and the other ends of said springs to the frame members 4 and 5. The springs 12 are of sufficient tension to hold the holder 6 elevated but not to prevent the holder 6 from being lowered by the operating mechanism 10.

On the lower face of the holder 6 I have mounted a brake shoe 13. The upper surface of the shoe 13 is provided with a plurality of shoulders 14 thereon engaging complementary grooves 15, provided in the lower surface of the holder 6. The groove and shoulder connection of the holder 6 and shoe 13, thus guides the shoe 13 in a relatively fixed position on the holder.

A bolt 16 is mounted in the shoe 13 and extends through the holder 6. The expansion spring 17 and binding nut 18 are mounted around the bolt 16 for the purpose of binding the shoe 13 and holder 6 into permanent engagement. By compressing the spring 17 the binding engagement between the shoe 13 and holder 6 may be relieved to permit the shoe 13 to be swung around throughout an arc of 180°, for the purpose to be hereinafter described in detail.

On the under face of the shoe 13 I have mounted a plurality of projecting edged bars 19, and arranged the same in staggered relation throughout the entire under surface of said shoe. The projecting end edge of each bar 19 is cut on a taper to provide a sharpened side edge 20. The bars 19 are arranged in the shoe 13 so that the sharpened edges 20 will be enabled to cut any surface they contact with. In order to operate my braking mechanism the control levers 10 are manipulated to depress the holder 6, shoe 13 and cutter bars 19, against the tension of the springs 12, into contact with the track or surface over which the vehicle moves so that the sharpened ends of the cutters 19 would engage the said track, and cut thereinto in the same manner that any type of steel cutting tool would remove a cut from an article being machined or finished. The cutter bars 19 are formed of an extremely hard and well tempered metal so as to remove a cut from the vehicle track when moved into engagement therewith, and to not immediately wear down to a non-cutting edge. The engagement of the cutter bars with the track is sufficient to retard the speed of the vehicle and to bring it to an immediate stop, to possibly ruin the vehicle traction surface in so doing but at the same time to prevent any serious injury to the vehicle or its occupants. From my experiments I am satisfied that my invention is effective to prevent vehicles from running away when their braking mechanisms become disorganized and ineffective, and hence to bring about a great saving, both in property and in life, on all vehicles which may be equipped with my invention.

I have arranged the brake shoe 13 on the holder 6 so that by a very simple operation the shoe 13 may be swung around on the holder 6, whereby the position of the said shoe 13, together with its cutter bars, will have the most effective placement to stop the speed of movement of the vehicle.

Having thus described this invention, what I claim and desire to secure by Letters Patent is:—

1. A brake for traction vehicles comprising a carrying frame; a shoe movably mounted on said frame; a plurality of cutting edged bars on the under side of said shoe; and means on said vehicle to move said edged bars relative to the frame into and from cutting contact with a traction surface.

2. A brake for a traction vehicle comprising, a frame mounted on said vehicle; a holder movably arranged on said frame; a shoe reversibly secured to said holder; a plurality of cutting edged bars on the under side of said shoe; and means on the vehicle to move said edged bars relative to the frame into and from cutting contact with a traction surface.

3. A brake for traction vehicles comprising a carrying shoe; a plurality of cutting edged bars arranged in staggered relation on the under side of said shoe and adapted to cut according to the direction of movement of the vehicle; and means on said vehicle to move said edged bars relative to the frame into and from cutting contact with a traction surface.

4. A brake for a traction vehicle, comprising, a frame mounted on said vehicle; a holder movably arranged on said frame; a shoe secured to said holder; a plurality of cutting edged bars arranged in staggered relation on the under side of said shoe and adapted to cut according to the direction of movement of the vehicle; and means on the vehicle to move said edged bars relative to the frame into and from cutting contact with a traction surface.

5. A brake for traction vehicles comprising a carrying frame; a shoe movably mounted on said frame; a plurality of cutting edged bars on the under side of said shoe; means to hold said bars in said shoe; and means on said vehicle to move said edged bars relative to the frame into and from cutting contact with a traction surface.

6. A brake for a traction vehicle, comprising, a frame mounted on said vehicle; a holder movably arranged on said frame; a shoe secured to said holder; a plurality of cutting edged bars on the under side of said shoe; means to hold said bars in said shoe; and means on the vehicle to move said edged bars relative to the frame into and from cutting contact with a traction surface.

7. A brake for traction vehicles comprising a carrying frame; a shoe movably mounted on said frame; a plurality of cutting edged bars arranged in staggered relation on the under side of said shoe and adapted to cut according to the direction of movement of the vehicle; means to hold said bars in said shoe; and means on said vehicle to move said edged bars relative to the frame into and from cutting contact with a traction surface.

8. A brake for a traction vehicle, comprising, a frame mounted on said vehicle; a holder movably arranged on said frame; a shoe secured to said holder; a plurality of cutting edged bars arranged in staggered relation on the under side of said shoe and adapted to cut according to the direction of movement of the vehicle; means to hold said bars in said shoe; and means on the vehicle to move said edged bars relative to the frame into and from cutting contact with a traction surface.

In testimony whereof, I have hereunto set my hand at San Francisco, California, this 28 day of October, 1924.

LEWIS H. HERSHFIELD.